(12) United States Patent (10) Patent No.: US 8,675,233 B2
Ogasawara et al. (45) Date of Patent: Mar. 18, 2014

(54) ELECTRONIC APPARATUS, METHOD OF CONTROLLING ELECTRONIC APPARATUS, AND STORAGE MEDIUM STORING ELECTRONIC APPARATUS CONTROL METHOD

(75) Inventors: Masashi Ogasawara, Kanagawa (JP); Yoshihiro Ogura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 242 days.

(21) Appl. No.: 13/294,317

(22) Filed: Nov. 11, 2011

(65) Prior Publication Data

US 2012/0127490 A1 May 24, 2012

(30) Foreign Application Priority Data

Nov. 24, 2010 (JP) ................................. 2010-261539

(51) Int. Cl.
*G06F 3/12* (2006.01)
*G06K 15/00* (2006.01)
(52) U.S. Cl.
USPC ............ 358/1.15; 358/1.16; 358/1.6; 358/1.2
(58) Field of Classification Search
None
See application file for complete search history.

(56) References Cited

U.S. PATENT DOCUMENTS

| | | | |
|---|---|---|---|
| 2007/0079121 A1* | 4/2007 | Sekiguchi et al. | 713/168 |
| 2007/0229876 A1* | 10/2007 | Takashima | 358/1.14 |
| 2011/0066886 A1* | 3/2011 | Sugiura et al. | 714/16 |
| 2011/0125655 A1* | 5/2011 | Chiyo et al. | 705/310 |
| 2011/0296400 A1* | 12/2011 | Ogura | 717/174 |
| 2011/0296405 A1* | 12/2011 | Ogura | 717/178 |

FOREIGN PATENT DOCUMENTS

JP 2009-271680 11/2009

* cited by examiner

*Primary Examiner* — Dov Popovici
(74) *Attorney, Agent, or Firm* — Cooper & Dunham LLP

(57) ABSTRACT

An electronic apparatus includes a communication unit to communicate with other electronic apparatuses and a license management apparatus; a license file management unit to obtain license files from the license management apparatus; a license information management unit to manage license information to determine licensed software programs; an apparatus management unit to manage apparatus-related information including component parts information; and a license distribution management unit. The license distribution management unit confirms that licensed software programs are present. When transferring licenses for the confirmed software programs, the license distribution management unit requests and obtains the license information and the apparatus-related information from the other electronic apparatuses. The license distribution management unit conducts a searching process to identify the electronic apparatuses to which licenses are allowed to be transferred based on the obtained license information and the apparatus-related information from the other electronic apparatuses, and transfers the licenses to the identified electronic apparatuses.

20 Claims, 14 Drawing Sheets

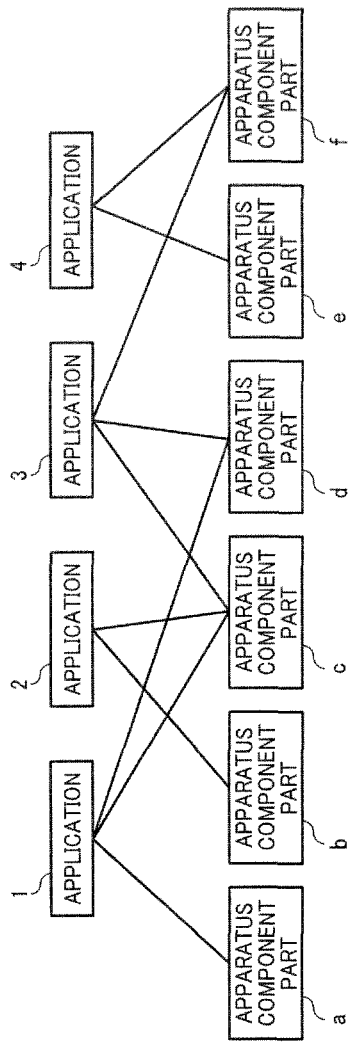

FIG. 14

| SORT KEY | EFFECT |
|---|---|
| MEMORY CAPACITY [GB] | APPLICATION EXECUTION SPEED CAN BE SET FASTER |
| HDD CAPACITY [GB] | APPLICATION INFORMATION CAN BE STORED WITH LARGE AREA |
| RESOLUTION LEVEL (MAXIMUM AT SCANNING) [dpi] | RESOLUTION LEVEL OF APPLICATION FOR IMAGE SCANNING CAN BE SET GREATER |
| RESOLUTION LEVEL (MAXIMUM AT WRITING) [dpi] | RESOLUTION LEVEL OF APPLICATION FOR IMAGE WRITING CAN BE SET GREATER |
| PRINTING SPEED [SHEETS/MIN] | PRINTING SPEED OF APPLICATION CAN BE SET FASTER |
| SCANNING SPEED [SHEETS/MIN] | SCANNING SPEED OF APPLICATION CAN BE SET FASTER |
| NETWORK TRANSFER SPEED [Mbps] | COMMUNICATION SPEED OF APPLICATION FOR NETWORK COMMUNICATION CAN BE SET FASTER |
| USE FREQUENCY OF FUNCTION | USE FREQUENCY OF EACH FUNCTION CAN BE CHECKED THE HIGHER THE USE FREQUENCY, THE HIGHER THE USE OF FUNCTION (FUNCTION IS MOST NEEDED FOR APPARATUS) |
| USE FREQUENCY OF APPARATUS | USE FREQUENCY OF EACH APPARATUS CAN BE CHECKED ADD FUNCTION TO LESSER OR LEAST USED APPARATUS |
| NUMBER OF REGISTERED USERS | LESSER OR LEAST USED APPARATUS CAN BE CHECKED ADD FUNCTION TO LESSER OR LEAST USED APPARATUS |

FIG. 15

| APPA-RATUS | MEMORY CAPACITY [GB] | HDD CAPACITY [GB] | RESO-LUTION LEVEL (MAXIMUM) AT SCANNING) [dpi] | RESO-LUTION LEVEL (MAXIMUM) AT WRITING) [dpi] | PRINTING SPEED [SHEETS /MIN] | SCANNING SPEED [SHEETS /MIN] | NETWORK TRANSFER SPEED [Mbps] | USE FREQUENCY OF FUNCTION | USE FREQUENCY OF APPARATUS | NUMBER OF REGISTERED USERS |
|---|---|---|---|---|---|---|---|---|---|---|
| A | 1 | 80 | 1200 | 1200 | 33 | 50 | 100 | 25 | 500 | 85 |
| B | 2 | 320 | 1200 | 1200 | 70 | 70 | 100 | 20 | 257 | 65 |
| C | 1 | 160 | 1200 | 1200 | 50 | 69 | 1000 | 50 | 280 | 62 |
| D | 1 | 160 | 1200 | 1200 | 50 | 60 | 1000 | 0 | 350 | 55 |
| E | 2 | 320 | 600 | 600 | 36 | 36 | 100 | 10 | 525 | 75 |
| F | 0.768 | 60 | 1200 | 1200 | 22 | 26 | 1000 | 35 | 325 | 122 |
| G | 1 | 80 | 1200 | 1200 | 33 | 50 | 100 | 35 | 250 | 101 |
| H | 0.768 | 60 | 1200 | 1200 | 22 | 26 | 1000 | 50 | 275 | 50 |

FIG. 16

| APPA-RATUS | MEMORY CAPACITY [GB] | HDD CAPACITY [GB] | RESO-LUTION LEVEL (MAXIMUM AT SCANNING) [dpi] | RESO-LUTION LEVEL (MAXIMUM AT WRITING) [dpi] | PRINTING SPEED [SHEETS /MIN] | SCANNING SPEED [SHEETS /MIN] | NETWORK TRANSFER SPEED [Mbps] | USE FREQUENCY OF FUNCTION | USE FREQUENCY OF APPARATUS | NUMBER OF REGISTERED USERS |
|---|---|---|---|---|---|---|---|---|---|---|
| C | 1 | 160 | 1200 | 1200 | 50 | 69 | 1000 | 50 | 280 | 62 |
| H | 0.768 | 60 | 1200 | 1200 | 22 | 26 | 1000 | 50 | 275 | 50 |
| G | 1 | 80 | 1200 | 1200 | 33 | 50 | 100 | 35 | 250 | 101 |
| F | 0.768 | 60 | 1200 | 1200 | 22 | 26 | 1000 | 35 | 325 | 122 |
| A | 1 | 80 | 1200 | 1200 | 33 | 50 | 100 | 25 | 500 | 85 |
| B | 2 | 320 | 1200 | 1200 | 70 | 70 | 100 | 20 | 257 | 65 |
| E | 2 | 320 | 600 | 600 | 36 | 36 | 100 | 10 | 525 | 75 |
| D | 1 | 160 | 1200 | 1200 | 50 | 60 | 1000 | 0 | 350 | 55 |

ELECTRONIC APPARATUS, METHOD OF CONTROLLING ELECTRONIC APPARATUS, AND STORAGE MEDIUM STORING ELECTRONIC APPARATUS CONTROL METHOD

CROSS-REFERENCE TO RELATED APPLICATIONS

This application claims priority to Japanese Patent Application No. 2010-261539, filed on Nov. 24, 2010 in the Japan Patent Office, which is incorporated by reference herein its entirety.

BACKGROUND OF THE INVENTION

1. Field of the Invention

The present invention relates to a wire or wirelessly communicable electronic apparatus including an image capturing device such as a scanner, an image forming apparatus such as a multi-functional apparatus, a copier, a facsimile machine, a printer, or an information processing apparatus such as a computer, and more particularly to management of transfer of licenses of software programs used in an electronic apparatus.

2. Description of the Background Art

Recently, multi-functional apparatuses (hereinafter "apparatuses") having various functions have been sold without pre-installment of application programs (hereinafter "applications") in the apparatuses. Instead, users purchase applications when required, and install the applications in the apparatuses to add functions useable for the apparatuses. When the applications are purchased and installed, licenses are managed in such a way that they are granted to the user for the applications installed in the apparatus to prevent unauthorized use of the application.

When such apparatuses installed with the applications are to be discarded due to malfunction or aging of the apparatuses, the licensed applications may be transferred to one or more other apparatuses as required. In such a situation, an operation to transfer applications and licenses is required, but such operation is time-consuming. Therefore, a license management system that can transfer a plurality of licenses with an uncomplicated configuration and operation has been proposed, as in JP-2009-271680-A.

JP-2009-271680-A discloses a method to transfer a plurality of licenses with a simple configuration and operation. In the license management system of JP-2009-271680-A, when a function-disabling process is initiated, all functions are disabled, a function-disabling key is issued, and resources for such functions are transferred to another apparatus. Then, a function-transfer-complete verification key is issued for the apparatus that has received the resources to implement a given function. When such keys are input to a license server, the license server database is updated and a function-enabling key is issued. When such function-enabling key is input to the other apparatus, the transferred function is readied for use.

However, in such conventional license management system, licenses for a plurality of applications or functions installed in one apparatus can be transferred to another apparatus, but the licenses can be transferred only to one other apparatus (one transfer destination), which means the licenses cannot be distributed to a plurality of apparatuses. If a user wants to distribute licenses for a plurality of applications to a plurality of apparatuses, the user needs to set the required keys one by one for each license transfer, which is a time-consuming.

SUMMARY

In one aspect of the invention, an electronic apparatus is devised. The electronic apparatus includes a communication unit to communicate with a plurality of other electronic apparatuses and with a license management apparatus for managing one or more license files; a storage device to store a plurality of software programs; a license file management unit to obtain one or more license files from the license management apparatus and to manage the one or more license files for granting licenses for some or all of the plurality of software programs; a license information management unit to manage license information useable to determine whether a license has been granted for each of the plurality of software programs; an apparatus management unit to manage apparatus-related information including information on one or more component parts required for executing each of the plurality of software programs; and a license distribution management unit to transfer a plurality of licenses to one or more electronic apparatuses. The license distribution management unit confirms that a plurality of licensed software programs is present among the plurality of software programs based on the license information managed by the license information management unit. When transferring one or more licenses among the licenses for the plurality of confirmed software programs, the license distribution management unit requests and obtains the license information and the apparatus-related information from each of the plurality of other electronic apparatuses. The license distribution management unit conducts a searching process for the plurality of electronic apparatuses to identify from the plurality of other electronic apparatuses one or more electronic apparatuses to which licenses are allowed to be transferred based on the obtained license information and apparatus-related information on the plurality of other electronic apparatuses, and transfers the plurality of licenses to the plurality of identified electronic apparatuses.

In another aspect of the invention, a method of transferring licenses for a plurality of software programs at one electronic apparatus to a plurality of other electronic apparatuses is devised. The method comprising the steps of a) requesting and obtaining license information from each of the other electronic apparatuses; b) requesting and obtaining from each of the other electronic apparatuses apparatus-related information including information on component parts required for executing each of the plurality of software programs and apparatus management information including status data of each of the other electronic apparatuses; c) identifying one or more of the other electronic apparatuses as electronic apparatuses to which licenses for the plurality of software programs at the one electronic apparatus that can be transferred based on the apparatus-related information obtained from the other electronic apparatuses; and d) transferring the licenses for the plurality of software programs at the one electronic apparatus to the one or more electronic apparatuses identified at the identifying step as electronic apparatuses to which the licenses can be transferred.

In another aspect of the invention, a non-transitory computer-readable storage medium storing a program comprising instructions that when executed by a computer causes the computer to execute a method of transferring licenses for a plurality of software programs from one electronic apparatus to a plurality of other electronic apparatuses is devised. The method comprising the steps of a) requesting and obtaining license information from each of the other electronic apparatuses; b) requesting and obtaining from each of the other electronic apparatuses apparatus-related information including information on component parts required for executing each of the plurality of software programs and apparatus management information including status data of each of the other electronic apparatuses; c) identifying one or more of the other electronic apparatuses as electronic apparatuses to which licenses for the plurality of software programs at the one electronic apparatus that can be transferred based on the apparatus-related information obtained from the other electronic apparatuses; and d) transferring the licenses for the plurality of software programs at the one electronic apparatus to the one or more electronic apparatuses identified at the identifying step as electronic apparatuses to which the licenses can be transferred.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 shows a relation between a plurality of applications useable for one or more image forming apparatuses of FIG. 1A and apparatus component parts required for implementing each one of the applications;

FIG. 4 shows one example relationship table of applications and apparatus component parts;

FIG. 14 shows a table explaining effect of each of the sort keys of FIG. 13;

FIG. 15 shows a list of a plurality of transfer-allowable apparatuses extracted as apparatuses that can be transferred with licenses of one application among a plurality of software programs; and FIG. 16 shows a list of a plurality of transfer-allowable apparatuses by rearranging the list of the plurality of transfer-allowable apparatuses of FIG. 15 using one or more sort keys.

Figure 1A:
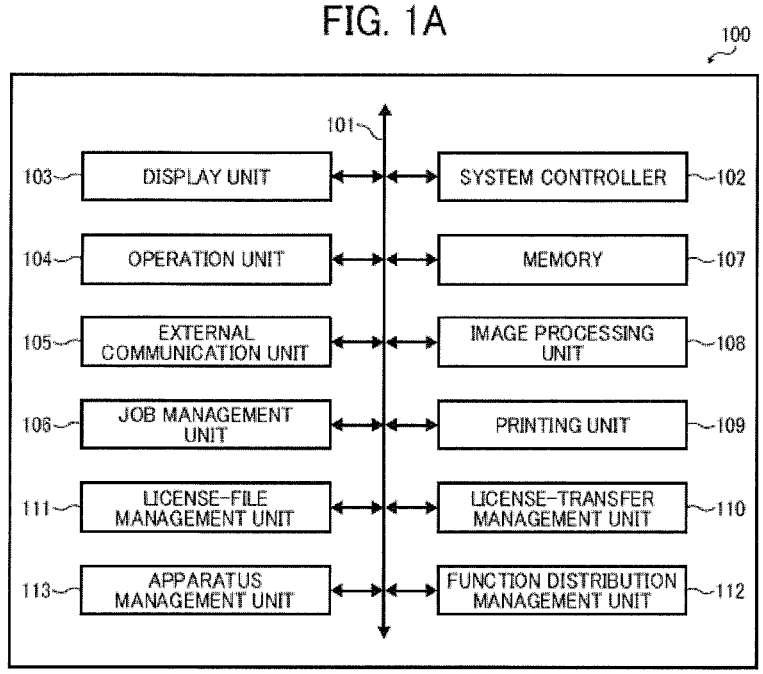
FIG. 1A shows a block diagram of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention. In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or a system, which can be used with a network, according to example embodiment is described hereinafter.

With an employment of example embodiment, a transfer of licenses of a plurality of applications installed in electronic devices or apparatuses such as image forming apparatuses (hereinafter, apparatuses as required) can be preferably conducted as disclosed in the following description. Specifically, an apparatus is communicably connected to a plurality of other apparatuses via a network which is wired or wirelessly. The apparatus obtains information for managing license transfer of application and information of apparatus component part from the plurality of other apparatuses to extract or search one or more image forming apparatuses that licenses of application can be transferred, in such extraction or searching process which one or more image forming apparatuses that licenses of application can be transferred can be identified, and such image forming apparatus may be referred to as identified image forming apparatuses. The apparatus component part may be also referred to as apparatus constituent part.

Figure 1B:
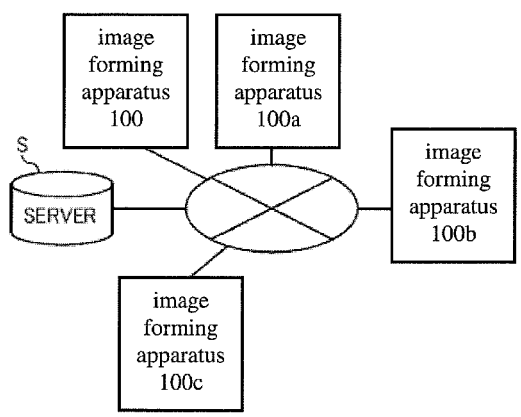
FIG. 1B shows an example operating environment of a plurality of image forming apparatuses connected to each other via a network.

A description is given of configuration of an image forming apparatus according to an example embodiment. FIG. 1A shows a block diagram of an image forming apparatus 100 according to an example embodiment. The image forming apparatus 100 such as a multi-functional apparatus includes a system controller 102, a display unit 103, an operation unit 104, an external communication unit 105, a job management unit 106, a memory 107, an image processing unit 108, a printing unit 109, a license-transfer management unit 110, a license-file management unit 111, a function distribution management unit 112, and an apparatus management unit 113, which are connected and capable of communicating with each other via a system bus 101. In an example embodiment, at least one of the units is implemented in hardware or as a combination of hardware/software combination. As shown in FIG. 1B, a plurality of image forming apparatuses 100, 100a, 100b, and 100c can be connected to each other via a network, and further a server may be connected to the network.

The system bus 101 is a path to connect a plurality of units configuring the image forming apparatus 100. The system controller 102 is a micro computer including a central processing unit (CPU), a read only memory (ROM), and a random access memory (RAM). Programs stored in a non-volatile memory such as a hard disk drive (HDD) or a flash memory can be loaded on a working area of the RAM, and then each unit can be controlled by executing programs. The RAM may be a semiconductor memory to store data.

The display unit 103 displays various information on a display such as a screen based on display data instructed from the system controller 102. Further, the display unit 103 may be disposed with a touch panel, which can function as an operation device.

The operation unit 104 is an operation device such as a mouse and a key board having function keys used for inputting various instructions to the image forming apparatus 100, and transmits an operation instruction signal corresponding to the operated (or pressed) key to the system controller 102.

The external communication unit 105 is a communication unit to communicate with an external apparatus such as a license management server, and other apparatuses. Further, other apparatuses may have similar functions of the image forming apparatus 100. Further, the license management server manages licenses of applications (e.g., software such as firmware, plug-in) used in the other apparatuses.

The job management unit 106 conducts a job scheduling such as scheduling of print jobs. For example, if restoring of snapshot information is being conducted when to return licenses, the licenses is returned after completing the restoring function.

The memory 107 is a non-volatile storage such as a hard disk drive (HDD) to store software program for a plurality of applications, management information required for applications to be described later, image data, print data, or the like.

The image processing unit 108 conducts an image processing to data, input from an external apparatus. For example, image data input from an image scanner or a personal computer, or print data such as character code data input from an external apparatus is converted to image data, and then the image processing such as scale enlargement/reduction, rotation is conducted, and the processed image data is output to the printing unit 109. Further, the image scanner scan document image and outputs image data.

The printing unit 109 is a printing device or apparatus including an image forming unit having, for example, a photoconductor of drum or belt type, a sheet feeder, and an ejection unit. In the printing unit 109, based on a print instruction from the system controller 102, the sheet feeder feeds a print medium such as a print sheet, then the image forming unit writes a latent image on the photoconductor based on image data input from the image processing unit 108 using a laser light or LED light, and then the latent image is developed by toner as toner image (visible image), and the toner image is transferred and fused to the print sheet, and the print sheet is ejected using the ejection unit.

The license-transfer management unit 110 can be used as a license information management unit. The memory 107 can store a plurality of applications, and license-related information such as status information of licenses of applications (e.g., application granted or not granted with licenses) and information of path to transfer licenses of applications. The license-transfer management unit 110 stores such information in the memory 107 and manages such information when conducting a license transfer operation among apparatuses.

The license-transfer management unit 110 may function differently from the license-file management unit 111.

The license-file management unit 111 may obtain or download a license file from a server such as a license management server using the external communication unit 105 and stores the license file in the memory 107, and manages the license file. The license-file management unit 111 uses the license file to grant licenses of a part or all of applications stored in the memory 107. For example, the license-file management unit 111 updates applications and returns licenses automatically using the license file information. The update of applications means an activation of applications (grant of licenses) and deactivation of applications (cancel of licenses).

Such license file information includes, for example, information of product identification (ID), apparatus identification information, and expiry date, but not limited thereto. The product ID is identification information of application or software program, which can be used as a product with a concerned license file. The apparatus identification information is identification information of an apparatus that can be used with a given license file, which means the given license file can be used only for an apparatus having a given apparatus identification information. The expiry date is a date that a licenses for the concerned license file is to be expired.

The function distribution management unit 112 can be used as a license distribution management unit. When licenses granted to a plurality of applications are to be distributed from one apparatus to other apparatus, the function distribution management unit 112 recognizes information of other apparatuses and determines a license transfer destination of each of applications based on the sort keys selected by a user's operation.

The apparatus management unit 113 can be used as an apparatus management unit. The apparatus management unit 113 stores apparatus-related information such as apparatus specification information, and granted licenses information in the memory 107. The apparatus management unit 113 can use such information to check whether a license transfer-candidate apparatuses can be used as a transfer destination of licenses of applications (i.e., license transfer destination) from a transfer-origin apparatus having licenses and applications. With such processing by the apparatus management unit 113, application functions can be distributed from the transfer-origin apparatus to other apparatuses, in which the apparatus management unit 113 determines whether an apparatus to be used as a license transfer-candidate has a capability to function a to-be-transferred application. In this disclosure, the term of application, application function, and function which can be implemented by software programs may be used with a similar meaning.

Further, the job management unit 106, the license-transfer management unit 110, the license-file management unit 111, the function distribution management unit 112, and the apparatus management unit 113 can be configured when the CPU runs programs loaded on a working area of RAM. As such, at least one or more of the units of apparatus can be implemented in hardware or as a combination of hardware/software combination.

Further, the external communication unit 105 can communicate with an external apparatus or server such as an application dispatching server, and can download applications from the application dispatching server using an instruction of the system controller 102. The downloaded application can be installed by the system controller 102, in which the downloaded application may be stored in the memory 107. As such, the system controller 102 can function as an application management unit. The above mentioned application dispatching server and the license management server may be disposed as separate servers or can be integrated as one server.

Figure 2:
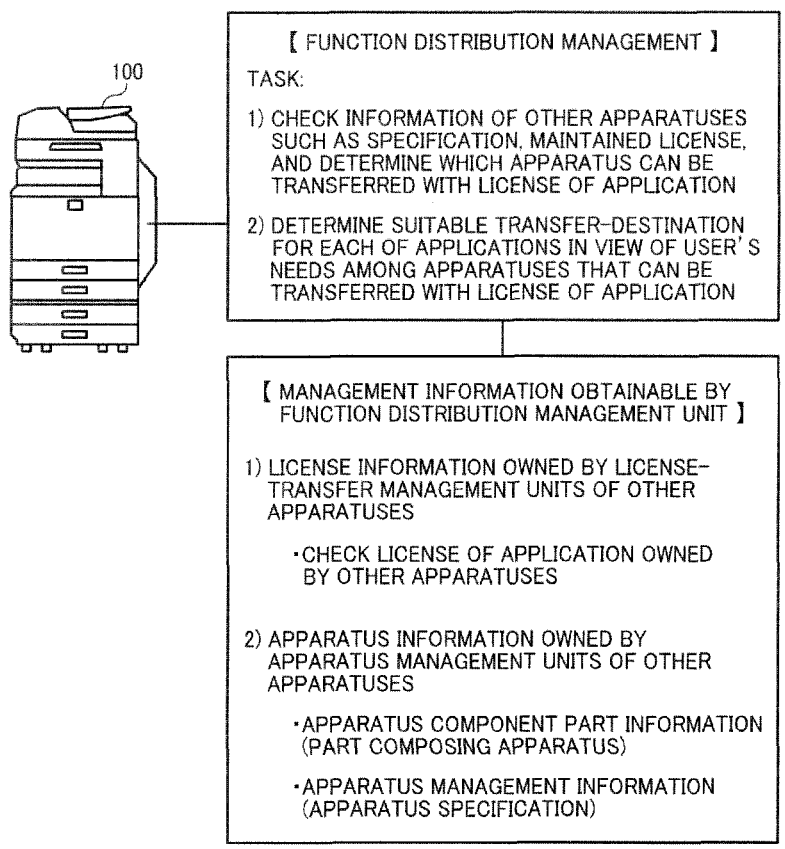
FIG. 2 shows a scheme of a function distribution management unit of FIG. 1A.

A description is given of the function distribution management unit 112 of FIG. 1A with reference to FIG. 2, which shows specific functions of the function distribution management unit 112. When one or more applications are to be distributed from one apparatus to a plurality of other apparatuses, the function distribution management unit 112 of one apparatus obtains following management information (1) and (2) from a license-transfer management unit and an apparatus management unit disposed in each of other apparatuses connected via a network.

(1) license information owned by a license-transfer management unit of other apparatus: this information is license information of applications or functions owned by the license-transfer management unit of each of other apparatuses such as information indicating whether a licenses is granted for each of applications and owned by each of other apparatuses. With such license information, it can be recognized which applications and licenses are owned by which apparatuses. Such license information may be used as identification information of applications granted with licenses.

(2) apparatus-related information owned by an apparatus management unit of other apparatus: this information is apparatus-related information owned by the apparatus management unit of each of plurality of other apparatuses. The apparatus-related information includes information of apparatus component part such as identification information of apparatus component parts and apparatus management information. The apparatus component parts are parts required to execute or implement an application, and such apparatus component parts may be different among different applications. As described later, an application or function can be executed using apparatus component parts disposed in each of other apparatuses.

The apparatus management information is status data of each of apparatuses. The apparatus management information may include information of devices such as a storage capacity of a memory and/or HDD of each of apparatuses, information of apparatus specification, and information of use frequency (e.g., the number of used times) of each of apparatuses. Further, the memory may be a semiconductor memory, but not limited thereto. Further, the status data may include a plurality of statuses, but can include only one status. If the status data is only one status, the sort key to be described later may not be required.

When distributing applications or functions to other apparatuses, the function distribution management unit 112 obtains the license information and apparatus-related information from the license-transfer management unit and the apparatus management unit disposed in each of other apparatuses. With such a configuration, the function distribution management unit 112 can recognize information of other apparatuses such as the specification of other apparatuses and license owned by other apparatuses, and can determine which apparatus can be transferred with licenses and applications. Then, among the apparatuses that can be transferred the licenses, the function distribution management unit 112 determines or selects a transfer destination suitable for each of applications in line with a user's intention. Further, such license transfer can be conducted via the license management server or such license transfer can be conducted between the apparatuses directly.

A description is given of relationship between a plurality of applications useable in each of apparatuses such as the image forming apparatuses and apparatus component parts required for executing or implementing each of applications with reference to FIG. 3. FIG. 3 shows a relationship between a plurality of applications and apparatus component parts required for executing or implementing each of applications.

Each of applications may need one or more apparatus component parts to execute each of the applications. Each of the apparatus component parts is a minimum unit or device to be used when executing a specific application, and each of the applications may need different apparatus component parts. Typically, each of the apparatuses such as a multi-functional apparatus has different apparatus component parts, and executable applications vary among the apparatuses. For example, as shown in FIG. 3, if one apparatus has apparatus component parts b, c, d, and f, such apparatus can execute applications 2 and 3.

FIG. 4 shows a relation between specific applications and specific apparatus component parts. For example, the apparatus component part required for a copy application includes a scanner to scan document image, and a printing device to print an image on a recording medium. The apparatus component part required for a printer application includes only a printing device. The apparatus component part required for a facsimile machine application includes a facsimile board to receive facsimile data such as image data and a printing device.

Figure 5:
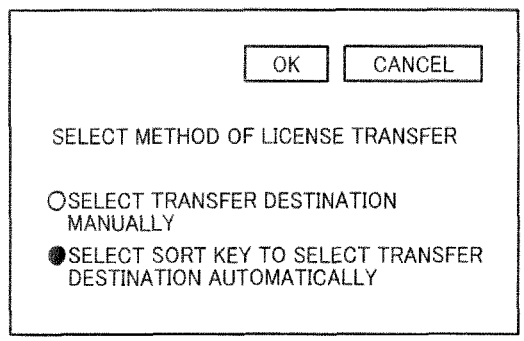
FIG. 5 shows one example screen view showing a GUI generate-able by the function distribution management unit of FIG. 1A.

A description is given of graphical user interface (GUI) displayed on a screen view used for the function distribution management unit 112 of FIG. 1A with reference to FIG. 5. FIG. 5 shows an example of GUI. After selecting a "license transfer" operation using an operation instruction signal generated by an operation on the operation unit 104, the function distribution management unit 112 can select a method of transferring licenses based on an operation instruction signal generated by a user operation on the GUI screen or on the operation unit 104.

For example, if the license transfer operation is selected, the GUI (FIG. 5) is displayed on the display unit 103. A user can select a method of transferring licenses (hereinafter, license transfer method) by operating the GUI or the operation unit 104, in which an operation instruction signal is generated by a user's operation. As shown in FIG. 5, a user can select "select transfer destination manually (manual selection mode)" or "select sort keys to select transfer destination automatically (automatic selection mode)."

If the manual selection mode (select transfer destination manually) is selected, license transfer-allowable apparatuses (hereinafter, transfer-allowable apparatuses) are extracted or searched automatically at first, and then a user selects a transfer-allowable apparatus by a user's manual operation. Further, instead of providing the instruction of "select transfer destination manually," another instruction such as "extract only transfer-allowable apparatuses automatically" can be displayed on the GUI, in which transfer-allowable apparatuses can be automatically extracted by a user's operation, and then a user selects a transfer-allowable apparatus from the extracted transfer-allowable apparatuses by a user's manual operation.

Figure 6:
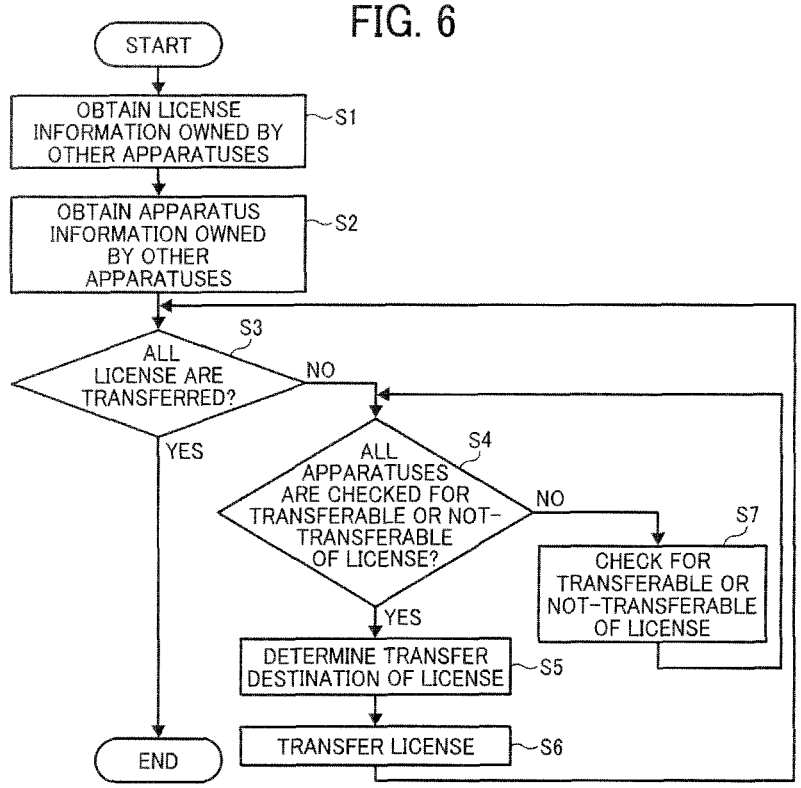
FIG. 6 shows a flowchart of steps of process of extracting a transfer-allowable apparatus using the function distribution management unit of FIG. 1A.

A description is given of a process of extracting or searching transfer-allowable apparatuses using the function distribution management unit 112 of FIG. 1A with reference to FIG. 6. FIG. 6 shows a flow chart of steps included in a process of extracting or searching transfer-allowable apparatuses. Based on the license information managed by the license-transfer management unit 110, the system controller 102 confirms that one or more of software programs having granted licenses exist for a plurality of applications stored in the memory 107. When a plurality of licenses of confirmed software programs are to be transferred, a process shown in FIG. 6 using the function distribution management unit 112 is started.

At step S1, the function distribution management unit 112 requests the license information to each of other apparatuses, which are candidates of license transfer destination, and obtains license information transmitted from each of other apparatuses. At step S2, the function distribution management unit 112 requests the apparatus-related information to each of other apparatuses, and obtains the apparatus-related information including information of apparatus component parts and apparatus management information transmitted from each of other apparatuses.

In each of other apparatuses, the license-transfer management unit manages license information as similar to the license-transfer management unit 110 of FIG. 1A, and the apparatus management unit manages apparatus-related information including the information of apparatus component parts and the apparatus management information as similar to the apparatus management unit 113 of FIG. 1A. As such, by obtaining the license information from each of other apparatuses, it can determine whether each one of applications can be implemented at each of other apparatuses. Further, by obtaining the apparatus-related information (e.g., apparatus management information including apparatus specification, the number of used times of apparatus) from each of other apparatuses, sort keys to be described later can be used.

After the function distribution management unit 112 obtains the license information and apparatus-related information from each of other apparatuses (steps S1 and S2), the function distribution management unit 112 determines whether all to-be-transferred licenses are already transferred at step S3. If all to-be-transferred licenses are already transferred (step S3: Yes), the process ends.

In contrast, if all to-be-transferred licenses are not yet transferred (step S3: No), the process goes to step S4. At steps S4 and S7, it is determined whether licenses can be transferred to each of apparatuses for each of transfer-allowable applications.

After determining whether licenses of each of applications can be transferred for all of the apparatuses at step S4 (all of the apparatuses are checked whether licenses of each of applications can be transferred with), a license transfer destination is determined or selected based on the sort keys at step S5, and then a license transfer is conducted at step S6. The determination of license transfer destination and license transfer operation will be described later in detail. Further, if the status data in the apparatus-related information obtained from each of other apparatuses is just one status data, a license transfer destination can be determined without using the sort keys.

Figure 7:
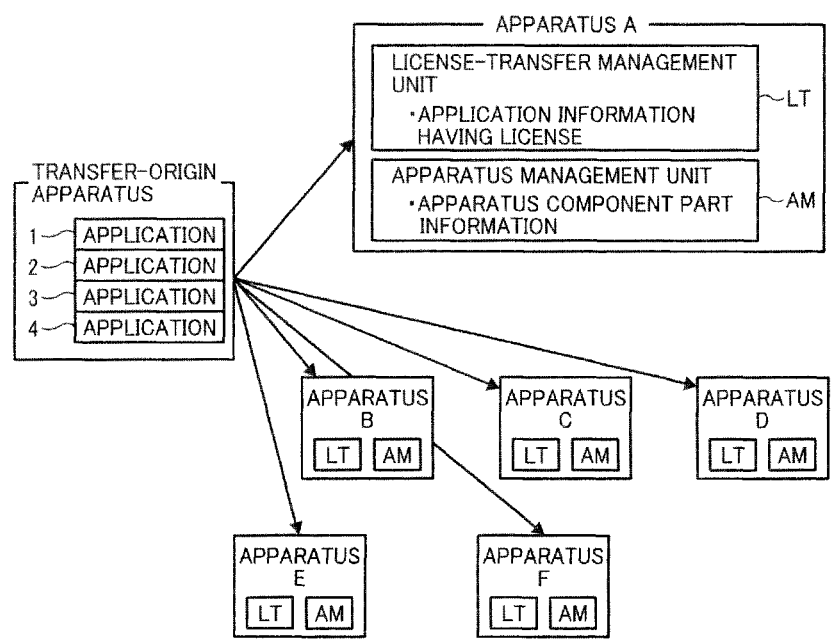
FIG. 7 shows a scheme of extracting the transfer-allowable apparatus when conducting steps of FIG. 6.

A description is given of an extraction or searching process of transfer-allowable apparatus corresponding to steps S1 to S4 and S7 of FIG. 6 with reference to FIGS. 7 to 10, which show schemes of extraction of transfer-allowable apparatuses. Further, for the sake of explanation, the application information granted with licenses is used as the license information. Further, apparatus component parts information is used as the apparatus-related information. In this example case, applications 1 to 4 installed in the image forming apparatus of FIG. 1A, referred to a transfer-origin apparatus in FIG. 7, are to be transferred to other image forming apparatuses.

As shown in FIG. 7, the transfer-origin apparatus can be connected to other apparatuses A to F via a network. The transfer-origin apparatus may request information of applications granted with licenses and information of apparatus component parts to the license-transfer management unit (LM) and the apparatus management unit (AM) in each of the apparatuses A to F to obtain such information.

Figure 8A:
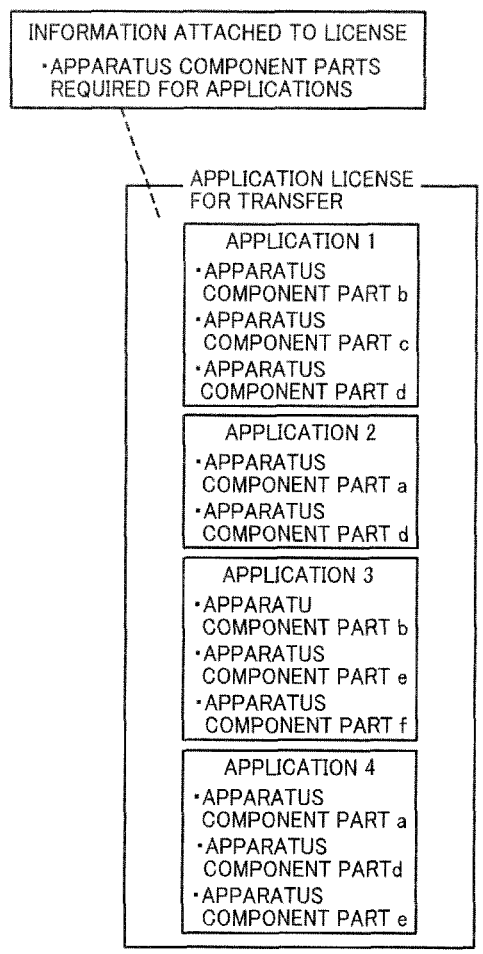
FIGS. 8A and 8B show a scheme of extracting the transfer-allowable apparatus when conducting steps of FIG. 6.
Figure 8B:
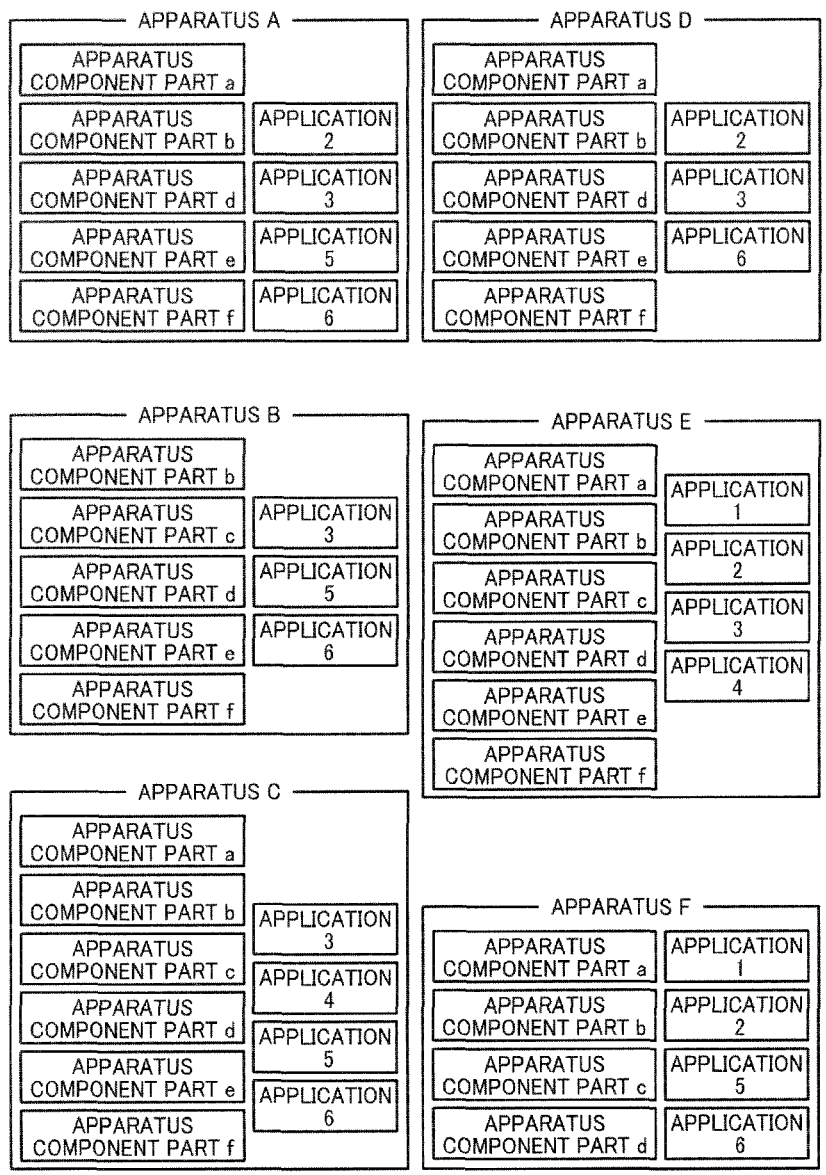

When the transfer-origin apparatus obtains such information from the apparatuses A to F, the information shown in FIGS. 8A and 8B can be obtained. Such information includes the license information of applications owned by each of the apparatuses and the information of apparatus component parts configuring each of the apparatuses. Further, the license information of applications can be attached with information of apparatus component parts required to execute each of applications.

Figure 9:
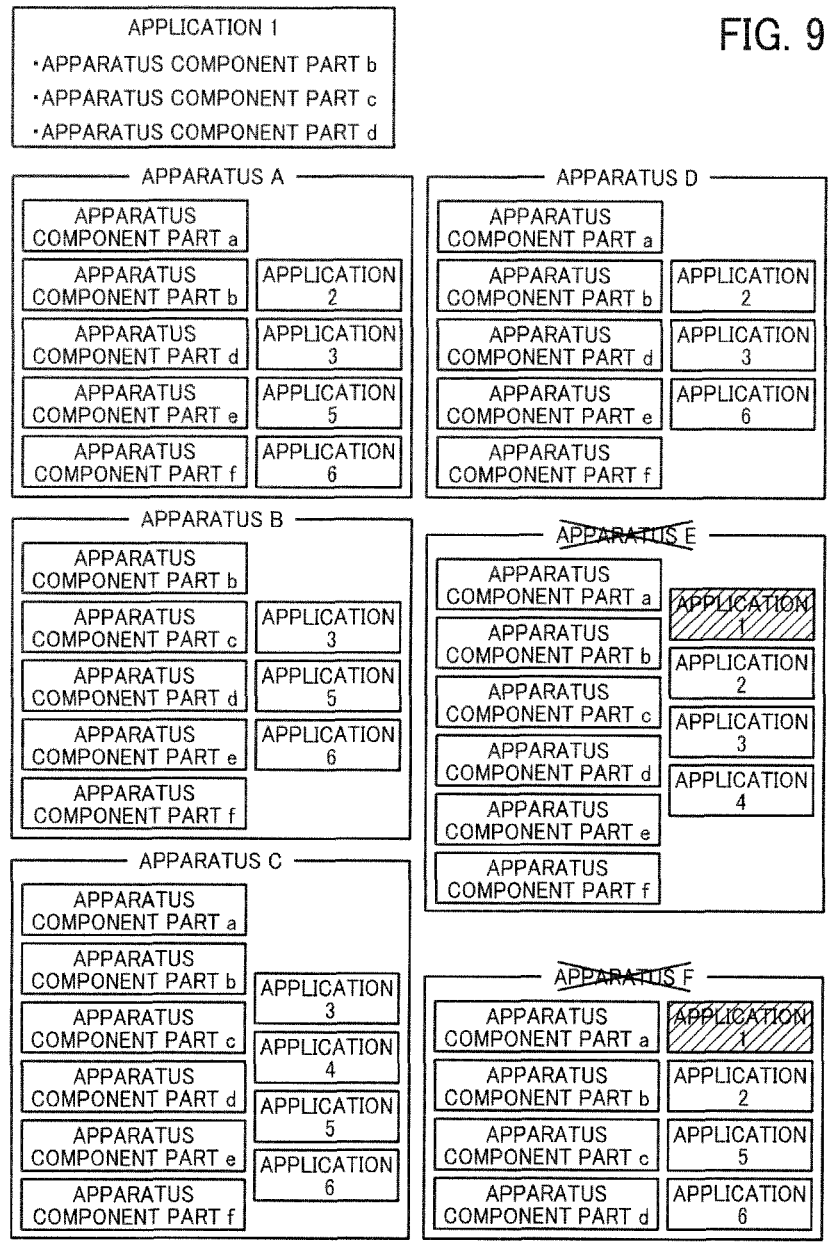
FIG. 9 shows a scheme of extracting the transfer-allowable apparatus when conducting steps of FIG. 6.
Figure 10:
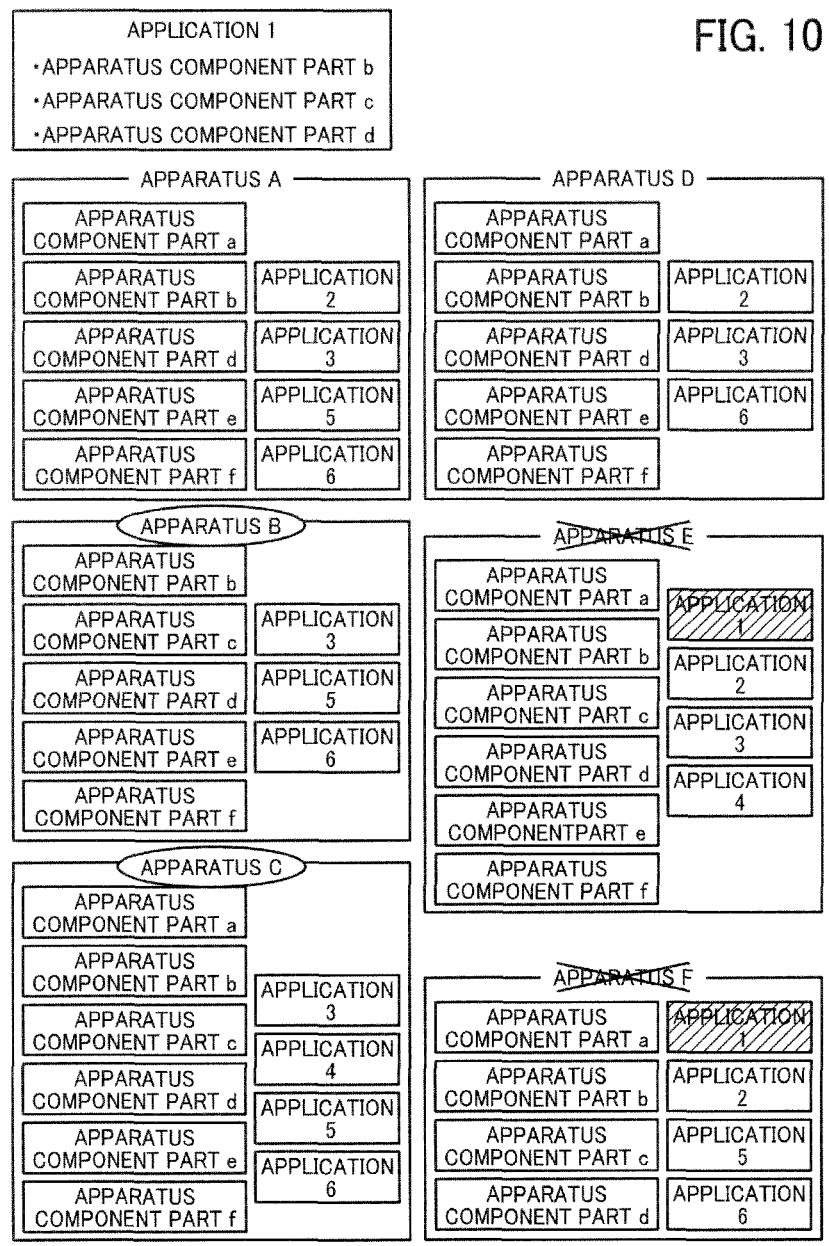
FIG. 10 shows a scheme of extracting the transfer-allowable apparatus when conducting steps of FIG. 6.

For example, when a transfer destination of application 1 is to be selected, an apparatus having the licenses of the same application (i.e., application 1) is excluded from a transfer destination candidate, and thereby apparatuses E and F are excluded from the transfer destination candidate as shown in FIG. 9 (see cross-line of FIG. 9). Because the application 1 requires the apparatus component parts of b, c, and d, apparatuses B and C having the apparatus component parts b, c, and d can be selected as transfer destination candidate as shown in FIG. 10 (see a circle of FIG. 10). Similar process can be conducted for other applications 2 to 4 to extract application transfer-allowable apparatuses for the applications 2 to 4.

Figure 11:
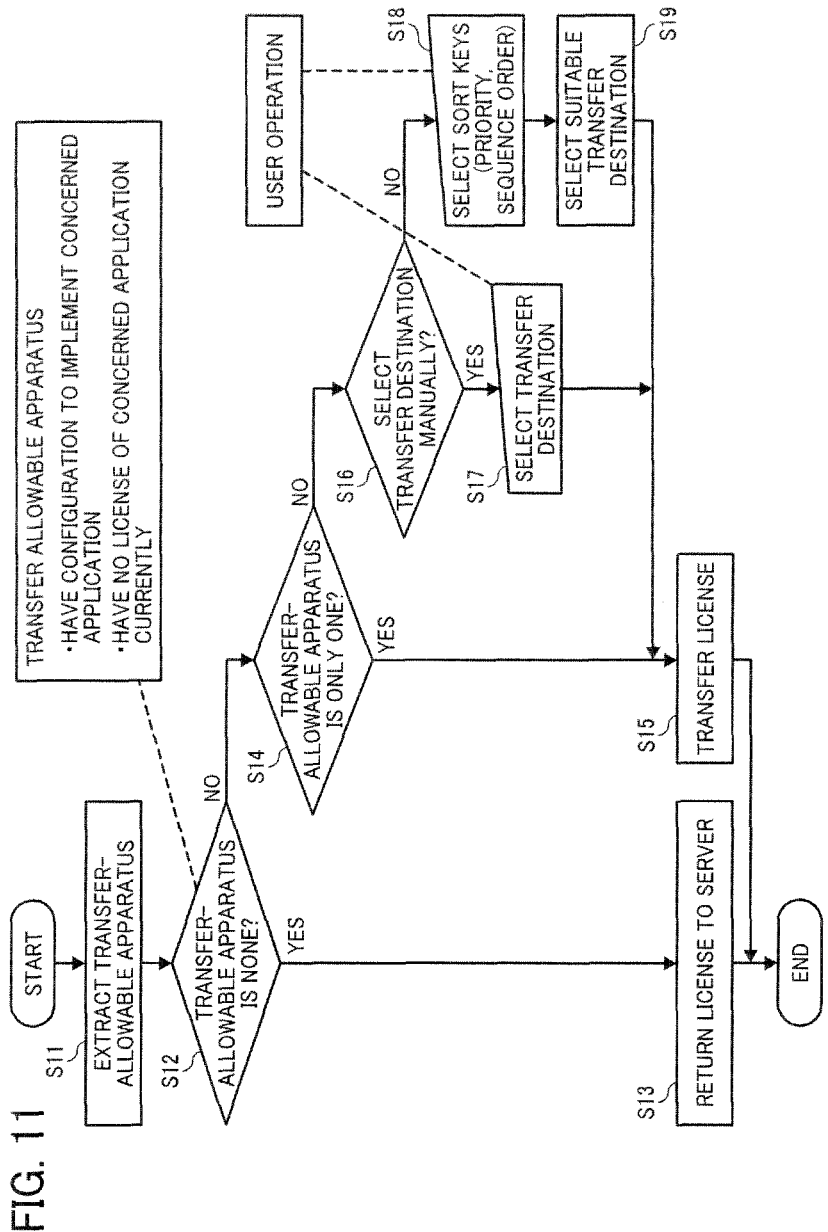
FIG. 11 shows a flowchart of steps of process of determining a transfer-allowable apparatus as a transfer destination using the function distribution management unit of FIG. 1A.

A description is given of a process of determining a transfer destination among transfer-allowable apparatuses (S5 and S6 of FIG. 6) using the function distribution management unit 112 of FIG. 1A with reference to FIG. 11, which shows a flow chart of steps included in a process of determining a transfer destination among transfer-allowable apparatuses.

At step S11, the function distribution management unit 112 conducts an extraction or searching process of transfer-allowable apparatuses, which corresponds to steps S1 to S4 and S7 of FIG. 6. Then, the process proceeds differently from step S12 and subsequent steps depending on the number of transfer-allowable apparatuses.

If it is determined that no transfer-allowable apparatus is extracted or searched by the extraction process (S12: Yes), the process proceeds to step S13, and a plurality of transfer-allowable licenses are returned to a server such as a license management server.

If it is determined that at least one transfer-allowable apparatus is extracted or searched by the extraction process (S12: No), the process proceeds to step S14, and it is determined whether the number of transfer-allowable apparatus is one or more at step S14. If it is determined that the number of transfer-allowable apparatus is one (step S14: Yes), the process proceeds to step S15, and the one apparatus is transferred with licenses, in which licenses required for the one apparatus is transferred among a plurality of transfer-allowable licenses.

Further, if it is determined that the number of transfer-allowable apparatus is a plurality of apparatuses (S14: No), the process proceeds to step S16, and a method of license transfer operation is determined. If a transfer method of "select transfer destination manually" is selected (S16: Yes), the process proceeds to step S17, and one apparatus is selected from a plurality of transfer-allowable apparatuses as a license transfer destination by a user's manual operation, and the process proceeds to step S15.

If a license transfer method of "select sort keys to select transfer destination automatically" is selected (S16: No), the process proceeds to step S18, in which one or more sort keys are selected by a user's operation in view of the priority level or sequence order of sort keys. Then, at step S19, one suitable apparatus may be selected from a plurality of transfer-allowable apparatuses as a license transfer destination in line with the selected sort keys, and the process proceeds to step S15.

Figure 12:
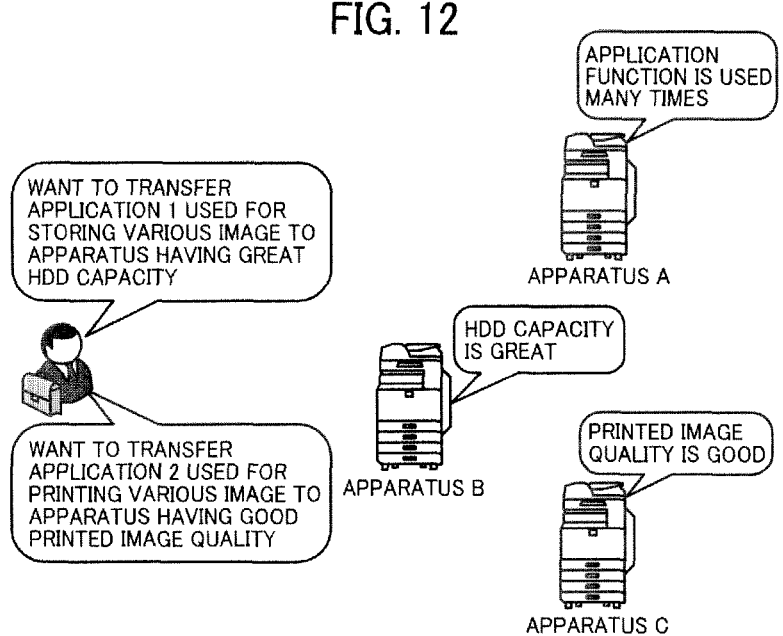
FIG. 12 shows a scheme of selecting a suitable transfer destination from a plurality of transfer-allowable apparatuses using sort keys.

A description is given of selection of a suitable transfer destination from a plurality of transfer-allowable apparatuses in line with the selected sort keys, conduct-able at step S19 of FIG. 11 with reference to FIG. 12. FIG. 12 shows a scheme of selecting a suitable transfer destination from a plurality of transfer-allowable apparatuses in line with the selected sort keys.

If a plurality of transfer-allowable apparatuses is present, there is a possibility that different applications are preferably transferred to different apparatuses. In such a situation, the function distribution management unit 112 selects one or more sort keys based on a user's operation, wherein such user's operation varies depending on user's intension for each of applications, and then a suitable transfer-allowable apparatus can be selected as a license transfer destination in line with the selected sort key.

In a case of FIG. 12, three transfer-allowable apparatuses A, B, and C are present, and a user can select an apparatus by selecting a sort key corresponding to a desired purpose based on the apparatus-related information obtained from the transfer-allowable apparatuses A, B, and C. For example, if a user wants to transfer application 1 to an apparatus having a great HDD capacity because the application 1 is used to store various types of image data, the user selects a sort key corresponding to an apparatus B having a great HDD capacity by comparing the HDD capacity information, included in the status data (or specification information) of the apparatus management information in the apparatus-related information obtained from each of the transfer-allowable apparatuses A, B, and C.

Further, if a user wants to transfer application 2 to an apparatus having a good printed image quality because the application 2 is used for printing various types of image data, the user selects a sort key corresponding to an apparatus C having a good printed image quality based on the resolution level of image writing (to be described later), included in the status data (or specification information) of the apparatus management information in the apparatus-related information obtained from each of the transfer-allowable apparatuses A, B, and C.

Figure 13:
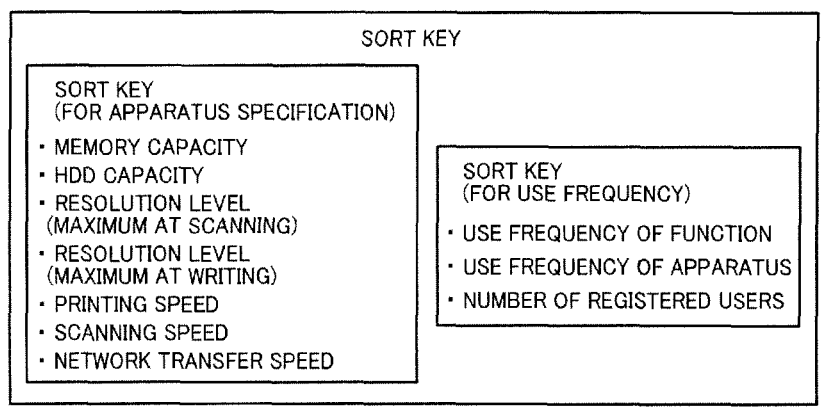
FIG. 13 shows examples of sort keys displayed on a GUI screen of the display unit 103 of FIG. 1A.

A description is given of the sort keys that can be displayed on a GUI on a screen of the display unit 103 with reference to FIGS. 13 and 14. FIG. 13 shows examples of sort keys, and FIG. 14 shows an effect of each of sort keys. The sort keys include a plurality of sort keys for apparatus specification, and a plurality of sort keys for use frequency as shown in FIG. 13.

The sort keys for apparatus specification may be a memory capacity of semiconductor memory, a memory capacity of HDD (HDD capacity), an image scanning resolution level of an image scanner (maximum resolution level at scanning), a writing resolution level of a printing unit (maximum resolution level at writing), a printing speed of a printing unit, a scanning speed of an image scanner, and a network transfer speed (network communication speed) of an external communication unit.

The sort keys for use frequency may be the number of used times of function or application of apparatus, a use frequency of apparatus, the number of registered users of apparatus.

The function distribution management unit 112 selects a sort key suitable for each of applications from a plurality of sort keys corresponding to a user's selection, and then selects a suitable transfer-allowable apparatus as a license transfer destination in line with the selected sort key.

For example, in a case of FIG. 12, a user wants to select a transfer-allowable apparatus having a great HDD capacity for the application 1, in which the user selects HDD capacity as a sort key by a user's operation. Then, the apparatus B having the greatest HDD capacity is selected as a license transfer destination of the application 1 by comparing the HDD capacity information included in status data of the apparatus management information in the apparatus-related information obtained from the transfer-allowable apparatuses A, B, and C, by which a large storing area can be provided for storing information of the application 1.

Further, each sort key can be selected by a user's operation, and each sort key has a following effect as shown in the table of FIG. 14.

When a sort key of memory capacity is selected, an apparatus having the greatest memory capacity can be selected, by which an application execution speed can be set faster.

When a sort key of HDD capacity is selected, an apparatus having the greatest HDD capacity is selected, by which application information can be stored with large storing area.

When a sort key of image scanning resolution level of an image scanner (maximum resolution level at scanning) is selected, an apparatus having the greatest resolution level is selected, by which a resolution level of application for image scanning can be set great.

When a sort key of writing resolution level of a printing unit (maximum resolution level at writing) is selected, an apparatus having the greatest resolution level is selected, by which a resolution level of application for image writing using the printing unit can be set great.

When a sort key of printing speed of a printing unit is selected, an apparatus having the greatest printing speed is selected, by which a printing speed of application can be set fast.

When a sort key of scanning speed of an image scanner is selected, an apparatus having the greatest scanning speed is selected, by which a scanning speed of application can be set fast.

When a sort key of a network transfer speed of an external communication unit is selected, an apparatus having the greatest network transfer speed is selected, by which a communication speed of application for network communication can be set fast.

When a sort key of use frequency of function (or the number of used times of function) is selected, an apparatus having the greatest number of used times of application or function is selected. Such application may be the most required application for the apparatus.

When a sort key of use frequency of apparatus is selected, an apparatus having lesser or least use frequency of apparatus is selected, and a new function is added to such apparatus.

When a sort key of the number of registered users is selected, an apparatus having lesser or least used apparatus is selected, and a new function is added to such apparatus.

A description is given of a process when a plurality of transfer-allowable apparatuses are extracted as license transfer apparatuses for the licenses of one application, which may occur at steps S11, S18 and S19 in FIG. 11 with reference to FIGS. 15 and 16.

As shown in FIG. 15, for example, when the function distribution management unit 112 extracts apparatuses A to H as transfer-allowable apparatuses for one application granted with licenses, two or more apparatuses among the apparatuses A to H may be determined to have the same status data (e.g., scanning resolution level at image scanner, writing resolution level at printing unit) by comparing the apparatus-related information obtained from the apparatuses A to H. If a sort key for such same status data, which is the same one for the two or more apparatuses, is selected, the priority order of apparatuses among the apparatuses A to H cannot be determined.

In view of such situation, a plurality of sort keys can be selected by setting priority levels by a user's operation. In an example case of FIG. 16, following three sort keys are selected by setting priority levels from 1 (high priority) to 3 (low priority).

1. sort key for use frequency of function (descending order)
2. sort key for memory capacity (descending order)
3. sort key for network transfer speed by external communication unit 105 (descending order)

When such three sort keys are selected, the function distribution management unit 112 can rearrange the order of apparatuses A to H shown in FIG. 15 to an order shown in FIG. 16 based on the status data in the apparatus-related information obtained from the apparatuses A to H, in which the apparatus C can be determined as a transfer destination of one application.

As such, in the image forming apparatus 100, based on the license information managed by the license-transfer management unit 110, the function distribution management unit 112 can confirm that a plurality of software programs granted with licenses exists for a plurality of applications stored in the memory 107 used as a storage.

When a plurality of licenses granted for the plurality of confirmed software programs installed in one electronic apparatus is to be transferred to a plurality of other electronic apparatuses, the above described license information and apparatus-related information are requested to the plurality of other electronic apparatuses, and the above described license information and apparatus-related information are transmitted from the plurality of other electronic apparatuses and obtained by the one electronic apparatus. Based on the obtained license information and apparatus-related information, transfer-allowable electronic apparatuses that can be transferred with a plurality of licenses can be searched from the plurality of other electronic apparatuses.

After conducting a searching process to the plurality of electronic apparatuses, a plurality of licenses can be transferred to the plurality of searched electronic apparatuses with a distributing manner, and a plurality of licenses of applications owned by one electronic apparatuses can be transferred to a plurality of other electronic apparatuses. Therefore, when the image forming apparatus 100 is to be discarded due to malfunction, aging, or the like, the number of licenses to be discarded can be decreased (or can be zero), by which the licenses of applications can be effectively used.

As above described, the above described example embodiment can devise the following effects (a) to (c).

(a) By selecting one or more electronic apparatuses as suitable transfer destinations for licenses of the plurality of confirmed applications by using the function distribution management unit 112, each of licenses granted for the plurality of applications can be effectively transferred to a suitable transfer destination.

(b) By conducting the above described searching process using the function distribution management unit 112, a plurality of transfer-allowable electronic apparatuses that can be transferred with at least one licenses of one software program from the plurality of confirmed licenses of software programs is searched, in which a license transfer destination is selected from the plurality of searched electronic apparatuses based on the status data of apparatus-related information obtained from the plurality of searched electronic apparatuses, and thereby licenses granted to the plurality of applications can be effectively transferred to a suitable transfer destination.

(c) By conducting the above described searching process using the function distribution management unit 112, a plurality of transfer-allowable electronic apparatuses that can be transferred with at least one licenses of software program from the plurality of confirmed licenses of software programs is searched, in which a license transfer destination is selected from the plurality of searched electronic apparatuses based on status data of apparatus-related information obtained from the plurality of searched electronic apparatuses, and based on different priority levels for sort keys corresponding to different status data (selected from a plurality of different status data by an operation instruction signal input via the above described operation unit), and thereby licenses granted to the plurality of applications can be further effectively transferred to a suitable transfer destination.

In the above described example embodiments, a multi-functional apparatus for image forming apparatus is explained as an example of electronic apparatuses, but the present invention is not limited thereto. For example, the present invention can be applied to other image forming apparatuses such as copiers, facsimile machines, and printers. Further, the present invention can be applied to various electronic apparatuses such as networked home appliances, automatic vending machines, medical devices, power source devices, air-conditioning system, metering system for gas/water/electricity, audio-visual devices, play machines, network-connectable computers, or the like.

A program according to the above described example embodiment is used so that the computer (e.g., CPU) of electronic apparatuses can devise the license file management unit, the license information management unit, the apparatus management unit, and the license distribution management unit. By running such program by the CPU, the above described effects can be attained. In the above described embodiments, at least one or more of the units of apparatus can be implemented in hardware or as a combination of hardware/software combination. In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. Further, in the above-described exemplary embodiment, a storage device (or recording medium), which can store computer-readable program, may be a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, hard disk in a server, or the like, but not limited these. Further, a computer-readable program can be downloaded to a particular computer (e.g., personal computer) via a network such as the internet, or a computer-readable program can be installed to a particular computer from the above-mentioned storage device, by which the particular computer may be used for the system or apparatus according to an example embodiment, for example.

In the above described example embodiments, a plurality of licenses of software programs installed or owned by an electronic apparatus can be transferred to a plurality of other electronic apparatuses effectively and efficiently.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined with each other and/or substituted for each other within the scope of this disclosure and appended claims.

What is claimed is:

1. An electronic apparatus, comprising:
   a communication unit to communicate with a plurality of other electronic apparatuses and with a license management apparatus for managing one or more license files;
   a storage device to store a plurality of software programs;
   a license file management unit to obtain one or more license files from the license management apparatus and to manage the one or more license files for granting licenses for some or all of the plurality of software programs;
   a license information management unit to manage license information useable to determine whether a license has been granted for each of the plurality of software programs; an apparatus management unit to manage apparatus-related information including information on one or more component parts required for executing each of the plurality of software programs; and
   a license distribution management unit to transfer a plurality of licenses to one or more electronic apparatuses,
   wherein the license distribution management unit confirms that a plurality of licensed software programs is present among the plurality of software programs based on the license information managed by the license information management unit,
   wherein when transferring one or more licenses among the plurality of licenses for the plurality of confirmed licensed software programs, the license distribution management unit requests and obtains the license information and the apparatus-related information from each of the plurality of other electronic apparatuses,
   wherein the license distribution management unit conducts a searching process for the plurality of other electronic apparatuses to identify from the plurality of other electronic apparatuses one or more electronic apparatuses to which licenses are allowed to be transferred based on the obtained license information and the apparatus-related information on the plurality of other electronic apparatuses, and transfers the plurality of licenses to the plurality of identified electronic apparatuses.

2. The electronic apparatus of claim 1, wherein the license distribution management unit selects one electronic apparatus as a suitable license transfer destination for each one of the plurality of confirmed licensed software programs.

3. The electronic apparatus of claim 2, wherein the apparatus management unit manages the apparatus-related information including the information on one or more component parts required for executing each one of the plurality of software programs and status data on each one of the electronic apparatuses,
   wherein when the plurality of other electronic apparatuses are identified as the electronic apparatuses to which licenses for at least one software program among the plurality of confirmed licensed software programs identified by the searching process are allowed to be transferred, the license distribution management unit selects a license transfer destination from the plurality of identified electronic apparatuses based on the status data of the apparatus-related information obtained from the plurality of identified electronic apparatuses.

4. The electronic apparatus of claim 3, further comprising a hard disk device to store data, wherein the status data includes information on storage capacity of the hard disk device.

5. The electronic apparatus of claim 3, further comprising a semiconductor memory to store data, wherein the status data includes information on storage capacity of the semiconductor memory.

6. The electronic apparatus of claim 3, further comprising an image scanner to scan a document image, wherein the status data includes information on scan resolution level of the document image scanned by the image scanner.

7. The electronic apparatus of claim 3, further comprising an image scanner to scan document images, wherein the status data includes information on scanning speed of the image scanner.

8. The electronic apparatus of claim 3, further comprising a printing unit to print an image on a medium, wherein the status data includes information on resolution level of the image printed by the printing unit.

9. The electronic apparatus of claim 3, further comprising a printing unit to print an image on a medium, wherein the status data includes information on printing speed of the printing unit.

10. The electronic apparatus of claim 3, wherein the status data includes information on network communication speed of the communication unit.

11. The electronic apparatus of claim 3, wherein the status data includes information on frequency of use of each of the plurality of software programs.

12. The electronic apparatus of claim 3, wherein the status data includes information of use frequency of each of the plurality of other electronic apparatuses.

13. The electronic apparatus of claim 3, wherein the status data includes information on number of registered users of each of the plurality of other electronic apparatuses.

14. The electronic apparatus of claim 2, further comprising an operation unit to enable input of operating instructions to the electronic apparatus,
   the apparatus management unit manages the apparatus-related information including the information on one or more component parts required for executing each of the plurality of software programs and a plurality of different status data related to the plurality of other electronic apparatuses,
   wherein when the plurality of other electronic apparatuses are identified by the searching process as the electronic apparatuses to which a license for at least one software program among the plurality of confirmed licensed software programs is allowed to be transferred, the license distribution management unit selects a license transfer destination from the plurality of identified electronic apparatuses based on the plurality of different status data obtained from the plurality of other electronic apparatuses searched, sort keys corresponding to status data selected from the plurality of different status data, and priority levels set for the selected sort keys, wherein the sort keys and the priority levels of the selected sort keys selectable by an operating instruction signal input from the operation unit.

15. The electronic apparatus of claim 2, further comprising an operation unit to enable input of operating instructions to the electronic apparatus,
wherein when the plurality of other electronic apparatuses are identified by the searching process as the electronic apparatuses to which a license for at least one software program among the plurality of confirmed licensed software programs is allowed to be transferred, the license distribution management unit selects a license transfer destination from the plurality of identified electronic apparatuses based on an operating instruction signal input from the operation unit.

16. The electronic apparatus of claim 1, wherein the license distribution management unit transfers the plurality of licenses to the plurality of identified electronic apparatuses from the electronic apparatus via the license management apparatus.

17. The electronic apparatus of claim 1, wherein the license distribution management unit directly transfers the plurality of licenses to the plurality of identified electronic apparatuses from the electronic apparatus.

18. The electronic apparatus of claim 1, wherein when one electronic apparatus is identified by the searching process, the license distribution management unit transfers a required license among the plurality of licenses to the identified electronic apparatus,
wherein when no electronic apparatus is identified by the searching process, the license distribution management unit returns the plurality of licenses to the license management apparatus.

19. A method of transferring licenses for a plurality of software programs at one electronic apparatus to a plurality of other electronic apparatuses, the method comprising the steps of:
a) requesting and obtaining license information from each of the other electronic apparatuses;
b) requesting and obtaining from each of the other electronic apparatuses apparatus-related information including information on component parts required for executing each of the plurality of software programs and apparatus management information including status data of each of the other electronic apparatuses;
c) identifying one or more of the other electronic apparatuses as electronic apparatuses to which licenses for the plurality of software programs at the one electronic apparatus are to be transferred based on the apparatus-related information obtained from the other electronic apparatuses; and
d) transferring the licenses for the plurality of software programs at the one electronic apparatus to the one or more electronic apparatuses identified at the identifying step as the electronic apparatuses to which the licenses are to be transferred.

20. A non-transitory computer-readable storage medium storing a program comprising instructions that when executed by a computer causes the computer to execute a method of transferring licenses for a plurality of software programs from one electronic apparatus to a plurality of other electronic apparatuses, the method comprising the steps of:
a) requesting and obtaining license information from each of the other electronic apparatuses;
b) requesting and obtaining from each of the other electronic apparatuses apparatus-related information including information on component parts required for executing each of the plurality of software programs and apparatus management information including status data of each of the other electronic apparatuses;
c) identifying one or more of the other electronic apparatuses as electronic apparatuses to which licenses for the plurality of software programs at the one electronic apparatus are to be transferred based on the apparatus-related information obtained from the other electronic apparatuses; and
d) transferring the licenses for the plurality of software programs at the one electronic apparatus to the one or more electronic apparatuses identified at the identifying step as the electronic apparatuses to which the licenses are to be transferred.

* * * * *